United States Patent Office 3,544,660
Patented Dec. 1, 1970

3,544,660
GRAFT POLYMERIZATION IN MASS OF VINYL CHLORIDE ON AN ETHYLENE-VINYL ACETATE COPOLYMER
Jean Claude Thomas and Francis Fournel, Lyon, and Salomon Soussan, Saint-Fons, France, assignors to Produits Chimiques Pechiney-Saint-Gobain, Paris, France
No Drawing. Filed Nov. 2, 1967, Ser. No. 680,027
Claims priority, application France, Nov. 14, 1966, 83,488
Int. Cl. C08f 15/40
U.S. Cl. 260—878       8 Claims

ABSTRACT OF THE DISCLOSURE

Resinous copolymers of high shock resistance are made by dissolving a first copolymer of vinyl acetate and ethylene in liquid vinyl chloride, the reaction mass being copolymerized, and the first copolymer grafted by vinyl chloride, under the conditions of temperature, pressure and catalysis characteristic of bulk polymerization.

---

The invention relates to a process of producing copolymers having a base of vinyl chloride modified by the inclusion, during polymerization, if a first copolymer of vinyl acetate-ethylene. Copolymerization is in bulk, also called in mass, and during the process the first copolymer is grafted. Copolymerization in bulk is in the absence of modifiers except the needful trace of catalyst.

Grafting is copolymerization producing lateral extension on an existing polymer chain.

Attempts have been made to produce copolymers of vinyl acetate, ethylene, and vinyl chloride and some success has been obtained, but the process of manufacture has been carried out in aqueous medium and has been difficult of execution and imperfect of result.

It is an object of this invention to produce novel compositions of matter by a novel process. The novel process uses any copolymer of vinyl acetate and ethylene, and liquid vinyl chloride as its starting materials and proceeds in bulk as a solution of vinyl acetate-ethylene polymer in vinyl chloride monomer with conditions of pressure, temperature and catalysis favorable to polymerization. The copolymer produced is notable as having polyvinyl chloride grafts on the vinyl acetate-ethylene polymer chains. A preferred process of polymerization includes an initial stage of high turbulence and a later stage of low turbulence. The products have good shock resistance and good resistance to hydrocarbon solvents.

The method of making the resins proceeds by dissolving a first copolymer of vinyl acetate-ethylene in liquid vinyl chloride, and subjecting the polymerization mass to conditions of temperature, pressure, agitation and catalysis favorable to bulk polymerization. The preferred process involves dissolving the first copolymer, that of vinyl acetate-ethylene, in liquid vinyl chloride, under conditions of temperature and pressure which keep the vinyl chloride liquid, adding more vinyl chloride than is required for the dissolving of the vinyl acetate-ethylene copolymer, so as to supply an amount for grafting, and subjecting the reaction mass to conditions of temperature, pressure and catalysis favorable to the polymerization of vinyl chloride in bulk, a first stage of polymerization being with highly turbulent agitation and a later stage with relatively mild agitation. There are several variants of the general method which deserve consideration.

In a first variant the first polymer (vinyl acetate-ethylene) is dissolved in liquid vinyl chloride, which contains the catalyst, at about 15°–30° C., preferably at 20°–25° C., the excess of vinyl chloride then being added and the reaction mass heated to a temperature favorable to polymerization, e.g. 40°–70° C.

In a second variant the first copolymer is dissolved in the liquid vinyl chloride at a temperature on the order of 40°–70° C., preferably 50°–60° C., the excess of vinyl chloride being added afterward with the catalyst.

The reaction mass should be agitated to facilitate the solution of the first copolymer in the vinyl chloride and its equal distribution therethrough, and to produce a product having good granulometry, uniformity of particle size being a desideratum. Agitation may be at constant speed by any standard agitator, but in the preferred process it involves a first stage of turbulent agitation followed by a second stage of mild agitation, using the same or different agitators. When the two stages are used, the first stage is terminated after the polymer has appeared and before the mass has become, in effect, a granular, a state which usually occurs at circa 15% total polymerization.

The vinyl acetate-ethylene copolymers used in the process may contain from about 20 to about 80% vinyl acetate but the preferred copolymer contains from about 30 to about 50% vinyl acetate. Examples of very satisfactory copolymers are one containing 33% vinyl acetate and one containing 45% vinyl acetate.

To make the product, from about 1 to 30% of the first copolymer may be included in the reaction mass, the percent being calculated on the total weight of vinyl chloride put into the reaction mass. After the vinyl acetate-ethylene has been dissolved in the vinyl chloride the reaction mass has two phases, liquid and gaseous; as polymerization progresses this is followed by the appearance of the solid, polymer, phase. It is preferred to include about 3–15% of the first copolymer in the reaction mass. Particularly favorable results are obtained if the excess of vinyl chloride, present for grafting, is about 30 to 90%, preferably 40–60% of the total weight of vinyl chloride used. However, the excess of vinyl chloride for grafting may be reduced until the total vinyl chloride employed is only that which is used to dissolve the first copolymer, in which case grafting occurs but not to the extent that occurs when an excess is used over what is required to make the solution. Also, it is to be noted that the vinyl chloride can be injected into the polymerization mass all at once or in portions.

The catalysis may be carried out with any of the catalysts useful in the polymerization of vinyl chloride in mass, but particularly favorable results have followed from the use of azodiisobutyronitrile alone or mixed with acetyl-cyclohexane-sulfonyl-peroxide, lauroyl peroxide alone or with acetyl-cyclohexane-sulfonyl peroxide, isopropyl-peroxy dicarbonate alone or with azodiisobutyronitrile or with lauroyl peroxide, and benzoyl peroxide.

The invention contemplates the use of a plurality of different first copolymers, as well as single members of the class, for instance those having different contents of vinyl acetate and ethylene.

The following examples illustrate the invention without departing from the generality of what has been elsewhere herein expressed:

EXAMPLE 1

A vertical, cylindrical, stainless steel autoclave of 100 l. capacity, enclosing a helical stirrer operating so as to continually displace and replace the material near the wall, received 44 kg. of vinyl chloride, 2 kg. of vinyl acetate-ethylene copolymer containing 45% of vinyl acetate and 20 g. of azodiisobutryonitrile catalyst (.05% by weight of the 40 kg. remaining after purging). The first copolymer dissolved with agitation in 1 hr. at 25° C., and the temperature was raised to 62° C. and held there for 10 hours. The pressure at the start of 62° procedure was 9.3 bars, decreasing with time, and the agitator was run at 40 r.p.m. Residual vinyl chloride was vented and recovered and 34.8 kg. of granular resin was discharged, a yield of 82% of the copolymer including 5.7% of the first copolymer, a resin having apparent density of .56. Its granulometry is listed in Table I.

TABLE I

| Screen apertures in microns: | Percent fallthrough |
| --- | --- |
| 630 | 73 |
| 500 | 69 |
| 400 | 68 |
| 315 | 66 |
| 250 | 59 |
| 200 | 53 |
| 160 | 40 |
| 100 | 29 |

The finished products obtained by calendering, extrusion, or the like, have excellent shock resistance as evidenced by the following tests of Charpy type:

A tube prepared by extrusion with a wall thickness of 2 mm. is cut open along the generatrix and pressed flat for 5 minutes at 160° C. to a length of 150 mm., a width of 12.5 mm., and a thickness of 2 mm.; a notch 2.5 mm. deep is cut into one side edge of the test piece. The ends of the test piece are clamped at a selected distance apart and a Charpy pendulum is directed against the edge of the test piece opposite the notch with an energy of 40 kg.f./cm.$^2$. Twenty test pieces are used for each test. Shock resistance is given by the formula: $R=W/S$, $R$ being kilogram-force in centimeters per square centimeter, $W$ being the energy absorbed by the shock in kilogram-force centimeter, and $S$ equals $h \times l$ in which $h$ is the thickness of the test piece and $l$ the distance between the bottom of the notch and the external face of the opposite edge. The resin prepared according to Example 1 had a shock resistance at 20° C. of 20 kg.f.cm./cm.$^2$. For comparison a homopolymer of vinyl chloride submitted to an identical test had a shock resistance of only 6 kg.f.cm./cm.$^2$.

EXAMPLE 2

The procedure was as in Example 1 but the agitation was at 100 r.p.m. for 3 hours and at 20 r.p.m. for 7 hours, all at 62° C.; initial pressure 9.3 bars.

The apparent density of the resin was .58 and its granulometry was in Table II.

TABLE II

| Screen apertures in microns: | Percent fallthrough |
| --- | --- |
| 630 | 80 |
| 500 | 78 |
| 400 | 75 |
| 315 | 74 |
| 250 | 73 |
| 200 | 50 |
| 160 | 30 |
| 100 | 5 |

EXAMPLE 3

The apparatus was in Example 1 but 44 kg. of vinyl chloride monomer and 2 kg. of the vinyl acetate-ethylene copolymer (45% vinyl acetate) were admitted and 4 kg. vinyl chloride vented to purge the autoclave. The agitation was at 40 r.p.m. for 15 minutes at 60° C., to dissolve the first copolymer in the monomer. 20 g. of the catalyst were injected, and agitation continued at the same rate for 10 hours. After venting, 34 kg. of resin were recovered, a yield of 80% based on the vinyl chloride employed. The resin contained 5.9% of the first copolymer and its properties were similar to those of the resin of Example 1.

EXAMPLE 4

The procedure was as in Example 3, 2 kg. of the first copolymer (45% vinyl acetate) in 40 kg. of vinyl chloride. After solution had been affected 20 g. azodiisobutyronitrile were added and agitation proceeded at 100 r.p.m. for 2 hours and 30 r.p.m. for 10 hours. The pressure was at 9.2 bars and the temperature at 60° C. After venting 34 kg of resin were discharged (80% yield) which had properties similar to those of the resin of Example 3.

The process has many advantages over those which were previously employed: The difficulties inherent in working in aqueous medium are overcome, the inclusion of suspension media and other auxiliaries of the suspension system are eliminated, together with their modifying effects on the nature of the product, the difficulties attending the use of vinyl acetate copolymers in aqueous medium, which were the greater the higher the content of vinyl acetate, is eliminated, and the apparatus is simplified and control of the process is easier.

In all the examples the product was a copolymer of vinyl chloride with the first copolymer of vinyl acetate-ethylene in which the first copolymer was grafted with polyvinyl chloride branches. The shock resistance and solvent resistance of products made from the resin were both high. The resin can be used for the press molding of structural parts, the extrusion of tubes, and, in short, for many of the uses to which polyvinyl chloride is used, being especially valuable where high shock resistance is desired.

As many apparently widely different embodiments of the present invention may be made without departing from the spirit and scope thereof, it is to be understood that the invention is not limited to the specific embodiments.

What is claimed is:

1. A method of making granular pearls of vinyl acetate-ethylene copolymer grafted by polyvinyl chloride which comprises dissolving from 1% to 30% by weight of a copolymer of vinyl acetate and ethylene containing from 20% to 80% of vinyl acetate in monomeric liquid vinyl chloride under non-polymerizing conditions, initiating the polymerization in mass by forming a solution consisting essentially of the copolymer, vinyl chloride and a catalyst at polymerization temperature, agitating the solution at high turbulence until not more than about 15% of the solution has been graft polymerized, then reducing the degree of agitation to relatively mild turbulence and continuing the polymerization for a longer period of time, and recovering the grafted polymer directly from the residual vinyl chloride in the form of pearls.

2. A method according to claim 1 in which an excess of vinyl chloride over that required to dissolve the first copolymer is added to the polymerization mass to increase the degree of grafting.

3. A method according to claim 1 in which the first copolymer contains 20–80% vinyl acetate.

4. A method according to claim 3 in which the first copolymer is from 1 to 30% of the weight of the vinyl chloride in the reaction mass.

5. A method according to claim 2 in which the excess for grafting is 30 to 90% by weight of the total vinyl chloride used for dissolving the first copolymer and for grafting.

6. A method according to claim 1 in which the temperature of the monomeric vinyl chloride at the time of dissolving the copolymer is about 15°–30° C.

7. A method according to claim 6 in which the first copolymer is dissolved in the vinyl chloride at about 40–70° C., the excess quantity of vinyl chloride for grafting is added to the solution at that temperature with the catalyst, and polymerization continues to a selected end point under conditions favorable to bulk polymerization.

8. A method according to claim 1 in which the vinyl chloride in excess of that required to dissolve the first copolymer is about 40 to 60% by weight of the total vinyl chloride in the reaction mass.

References Cited

UNITED STATES PATENTS

| | | | |
|---|---|---|---|
| 3,322,858 | 5/1967 | Coaker et al. | 260—876 |
| 3,330,786 | 7/1967 | Finestone et al. | 260—880 |
| 3,358,054 | 12/1967 | Hardt et al. | 260—878 |

FOREIGN PATENTS

| | | | |
|---|---|---|---|
| 1,381,031 | 10/1964 | France | 260—878 |

MURRAY TILLMAN, Primary Examiner

M. J. TULLY, Assistant Examiner